United States Patent [19]
Ochiai

[11] Patent Number: 5,934,958
[45] Date of Patent: Aug. 10, 1999

[54] EXHAUST TIMING CONTROL VALVE CONTROL ARRANGEMENT

[75] Inventor: Nobuyuki Ochiai, Iwata, Japan

[73] Assignee: Yamaha Hatsudoki Kabushiki Kaisha, Iwata, Japan

[21] Appl. No.: 08/950,699

[22] Filed: Oct. 15, 1997

[30] Foreign Application Priority Data

Oct. 15, 1996 [JP] Japan .................................. 8-294365

[51] Int. Cl.⁶ .................................................. B63H 21/32
[52] U.S. Cl. ...................................... 440/89; 123/65 PE
[58] Field of Search .................................. 440/88, 89, 1, 440/2, 38, 84; 114/270; 123/65 PE

[56] References Cited

U.S. PATENT DOCUMENTS

| | | |
|---|---|---|
| 4,388,894 | 6/1983 | Tanaka et al. . |
| 4,986,780 | 1/1991 | Sougawa . |
| 5,183,013 | 2/1993 | Ito et al. . |
| 5,190,006 | 3/1993 | Motoyama et al. . |
| 5,322,044 | 6/1994 | Maebashi . |
| 5,400,755 | 3/1995 | Maebashi . |
| 5,410,993 | 5/1995 | Masuda et al. . |
| 5,575,246 | 11/1996 | Ito . |
| 5,598,813 | 2/1997 | Masuda et al. . |
| 5,605,119 | 2/1997 | Masuda et al. . |
| 5,709,177 | 1/1998 | Worth .................................. 123/65 PE |
| 5,715,794 | 2/1998 | Nakamura et al. . |
| 5,782,214 | 7/1998 | Nanami et al. . |

*Primary Examiner*—Stephen Avila
*Attorney, Agent, or Firm*—Knobbe, Martens, Olson & Bear LLP

[57] ABSTRACT

An exhaust timing control valve control arrangement is disclosed. The exhaust valve is positioned in an exhaust port of an engine and movable between a retracted position in which the exhaust flow timing is advanced, and an extended position into the port in which the exhaust flow timing is retarded. A control is provided for moving the valve in a cleaning operation after the engine is started and running above a predetermined low speed. The cleaning operation may additionally be performed when the engine is shut off.

23 Claims, 6 Drawing Sheets

EXHAUST TIMING CONTROL VALVE CONTROL ARRANGEMENT

FIELD OF THE INVENTION

The present invention relates to an exhaust valve control. More particularly, the invention is an exhaust valve control providing an exhaust valve cleaning mode.

BACKGROUND OF THE INVENTION

Internal combustion engines include exhaust control mechanisms for controlling the flow of exhaust from each combustion chamber of the engine. In most instances, these mechanisms comprise valves.

In those instances where the engine operates on a two-stroke or two-cycle principal, the valve is often of the sliding or rotating type. Generally, this type of valve does not serve to ever completely close the opening or port in the combustion chamber wall or the exhaust passage. Instead, the valve moves between a first position in which the valve does not obstruct or obstructs very little of the exhaust port, and a second position in which the valve partly obstructs the port. Because the sliding or rotating type valve can partially obstruct the exhaust passage, it can be used to control the timing of the exhaust flow, and thus the performance or running conditions of the engine.

The sliding or rotating type valve, however, suffers partly in its reliability. Because these valves have a relatively small range of movement and are not continuously moved, they may seize within the guide in which they are mounted. Providing lubricant to the valve reduces this problem somewhat, but suffers from the attendant problem that the high temperature of the engine may reduce the lubricant into carbon deposits on the valve, causing the valve to seize.

An exhaust control for an engine of the type utilized to power a watercraft which is reliable and easy to maintain is desired.

SUMMARY OF THE INVENTION

In accordance with the present invention, there is provided a control arrangement for an exhaust timing control valve of an engine, the control arrangement including an exhaust timing control valve cleaning mode or operation.

Preferably, the engine is of the type including at least one combustion chamber having an exhaust port or passage leading therefrom for directing exhaust from the combustion chamber. A valve cooperates with the port to control the timing of the flow of exhaust from the combustion chamber. The valve is movable between a first position in which the valve is retracted and the exhaust flow timing is advanced, and a second position in which the valve is extended into the port and the exhaust flow timing is retarded.

Control means are provided for moving the valve in a cleaning mode in which the valve is moved at least partially between its first and second positions. Preferably, the control means operates the valve in the cleaning mode after the engine is started and running between a predetermined low and predetermined high speed.

In a preferred embodiment, a drive control controls a means for moving the valve between its two positions, and the main control controls the drive control. In this arrangement, the main control preferably turns on the drive control when the engine is started and shuts it off when the engine is stopped.

As another aspect of the invention, the control unit also operates the valve in a cleaning mode when the engine is detected as being shut off, such as when an ignition switch is turned off or when the engine speed falls below a predetermined low speed.

Further objects, features, and advantages of the present invention over the prior art will become apparent from the detailed description of the drawings which follows, when considered with the attached figures.

DETAILED DESCRIPTION OF THE PREFERRED EMBODIMENTS OF THE INVENTION

The present invention is an exhaust control for an engine of the type utilized to power a watercraft, and more particularly, a personal watercraft.

Figure 1:
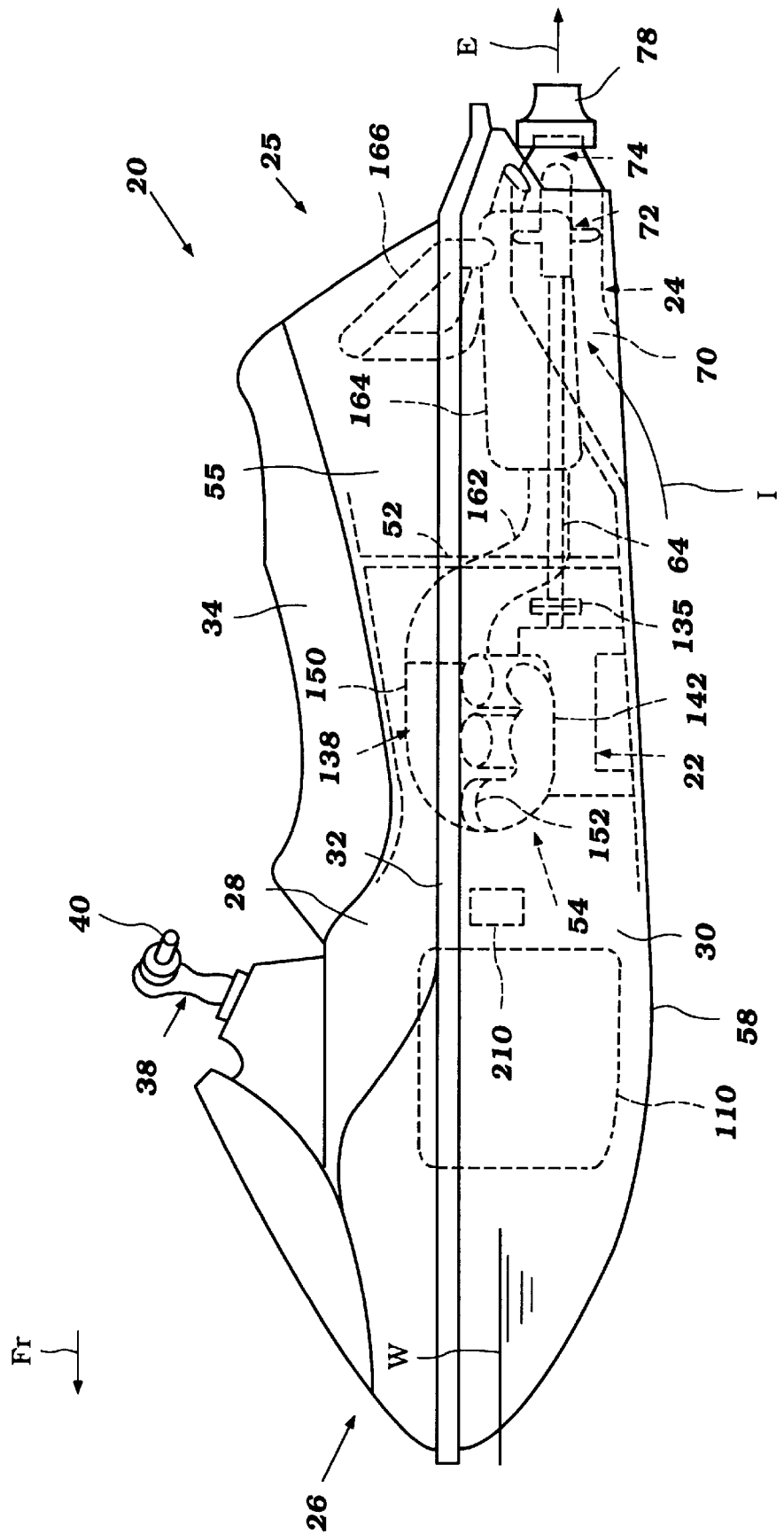
FIG. 1 is a side view of a personal watercraft of the type powered by an engine having an exhaust control in accordance with the present invention, the engine and other watercraft components positioned within the watercraft illustrated in phantom.
Figure 2:
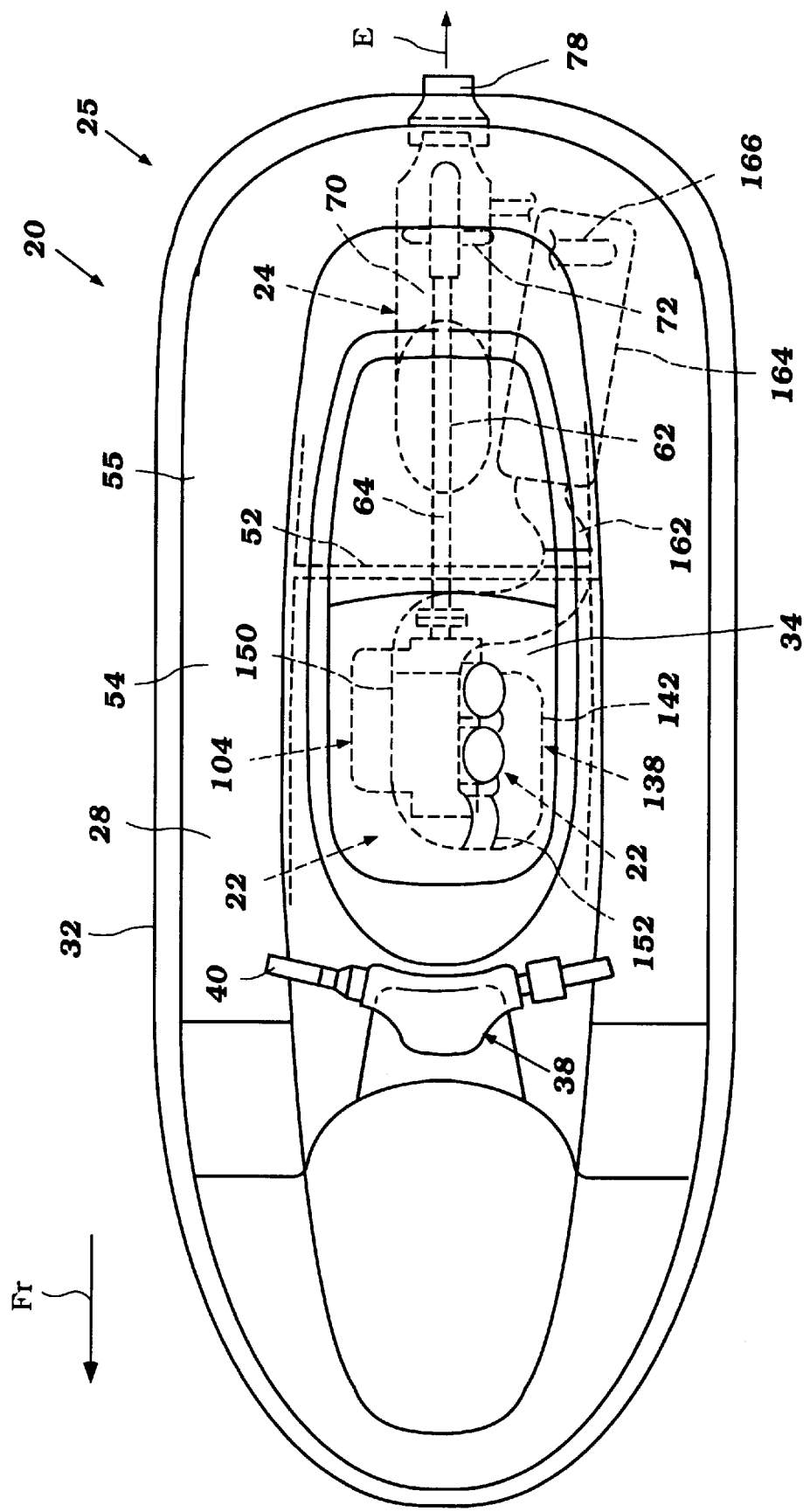
FIG. 2 is a top view of the watercraft illustrated in FIG. 1, with the engine and other watercraft components positioned within the watercraft illustrated in phantom.

FIGS. 1 and 2 illustrate a watercraft 20 having a watercraft body 25 comprising a hull 26 having a top portion or deck 28 and a lower portion 30. A gunnel 32 defines the intersection of the hull 26 and the deck 28.

A seat 34 is positioned on the top portion 28 of the hull 26. The seat 34 is preferably connected to a removable deck member. A steering mechanism 38 including a steering handle 40 is provided adjacent the seat 32 for use by a user in directing the watercraft 20.

Figure 3:
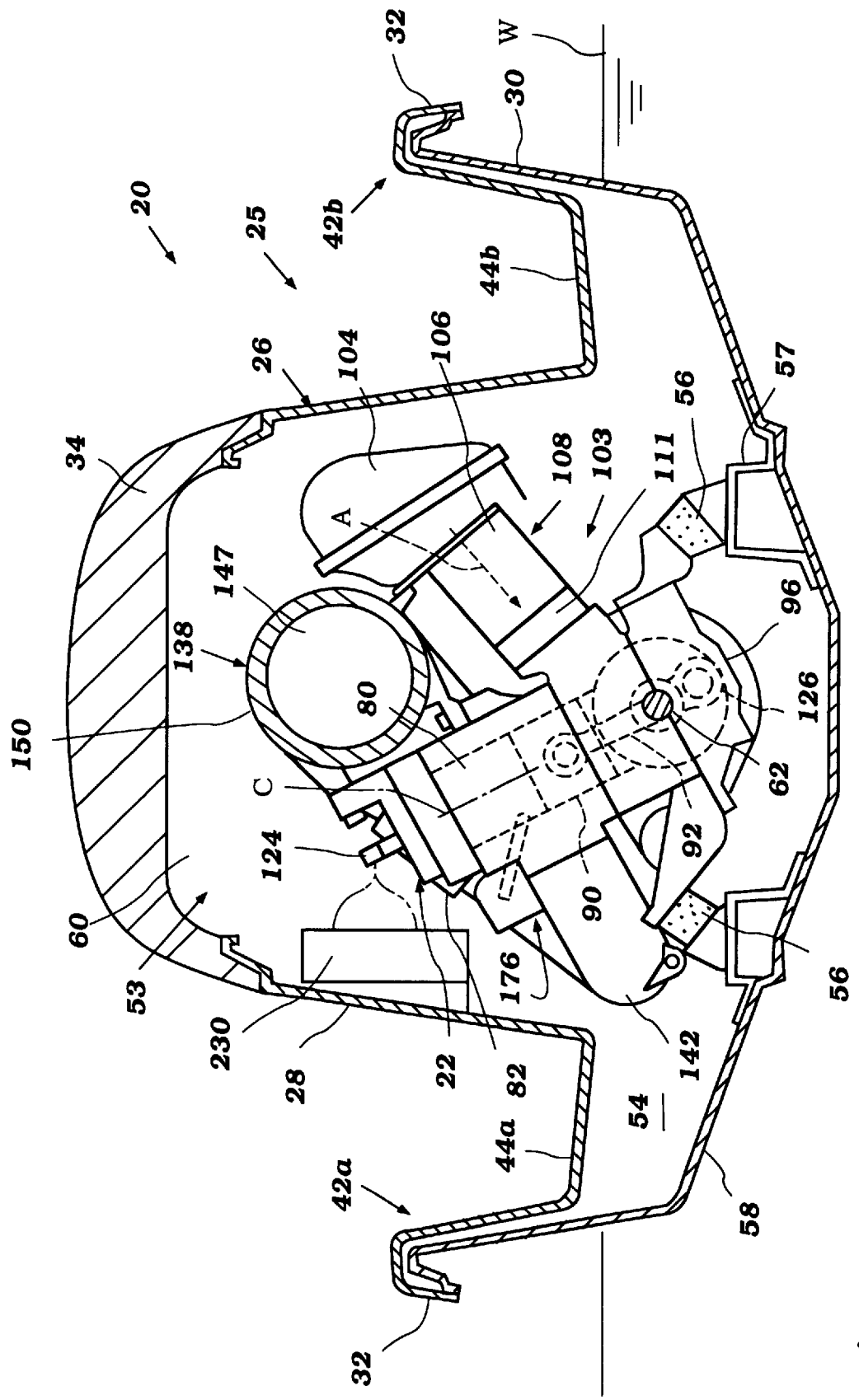
FIG. 3 is a cross-sectional end view of the watercraft illustrated in FIG. 1, illustrating the engine therein and a portion of the exhaust system in cross-section.

As best illustrated in FIG. 3, a bulwark 42a,b extends upwardly along each side of the watercraft 20. A foot step area 44a,b is defined between the seat 34 and its adjacent bulwark 42a,b.

The top and bottom portions 28,30 of the hull 26, along with a bulkhead 52, define an engine compartment 54 and a pumping chamber 55. The engine 22 is positioned in the engine compartment 54. As best illustrated in FIG. 3, the engine 22 is connected to the hull 26 via several engine mounts 56 connected to a bottom 58 of the lower portion 30 of the hull 26. The mounts 56 preferably comprise a resilient member connected to a support 57 extending up from the bottom 58 of the lower portion 30 of the hull 26. The engine 22 is preferably partially accessible through a maintenance opening 60 accessible by removing the removable deck member on which the seat 34 is mounted.

The engine 22 has a crankshaft 62 (see FIG. 3) which is in driving relation with an impeller shaft 64. The impeller shaft 64 rotationally drives a means for propelling water of a propulsion unit 24, which unit extends out a stern portion of the watercraft 20 opposite the front end Fr (see FIGS. 1 and 2).

Referring to FIG. 1, the propulsion unit 24 includes a propulsion passage 70 having an intake port which extends through the lower portion 30 of the hull 28. Water W from the body of water in which the craft 20 is positioned is drawn in the direction I into the intake port. The means for propelling water, preferably an impeller 72 driven by the impeller shaft 64, is positioned in the passage 70. The passage 70 has an outlet 74 positioned within a nozzle 78. The nozzle 78 is mounted for movement up and down and to the left and right for expelling water in a corresponding direction E, whereby the direction of the propulsion force for the watercraft 20 may be varied.

Figure 4:
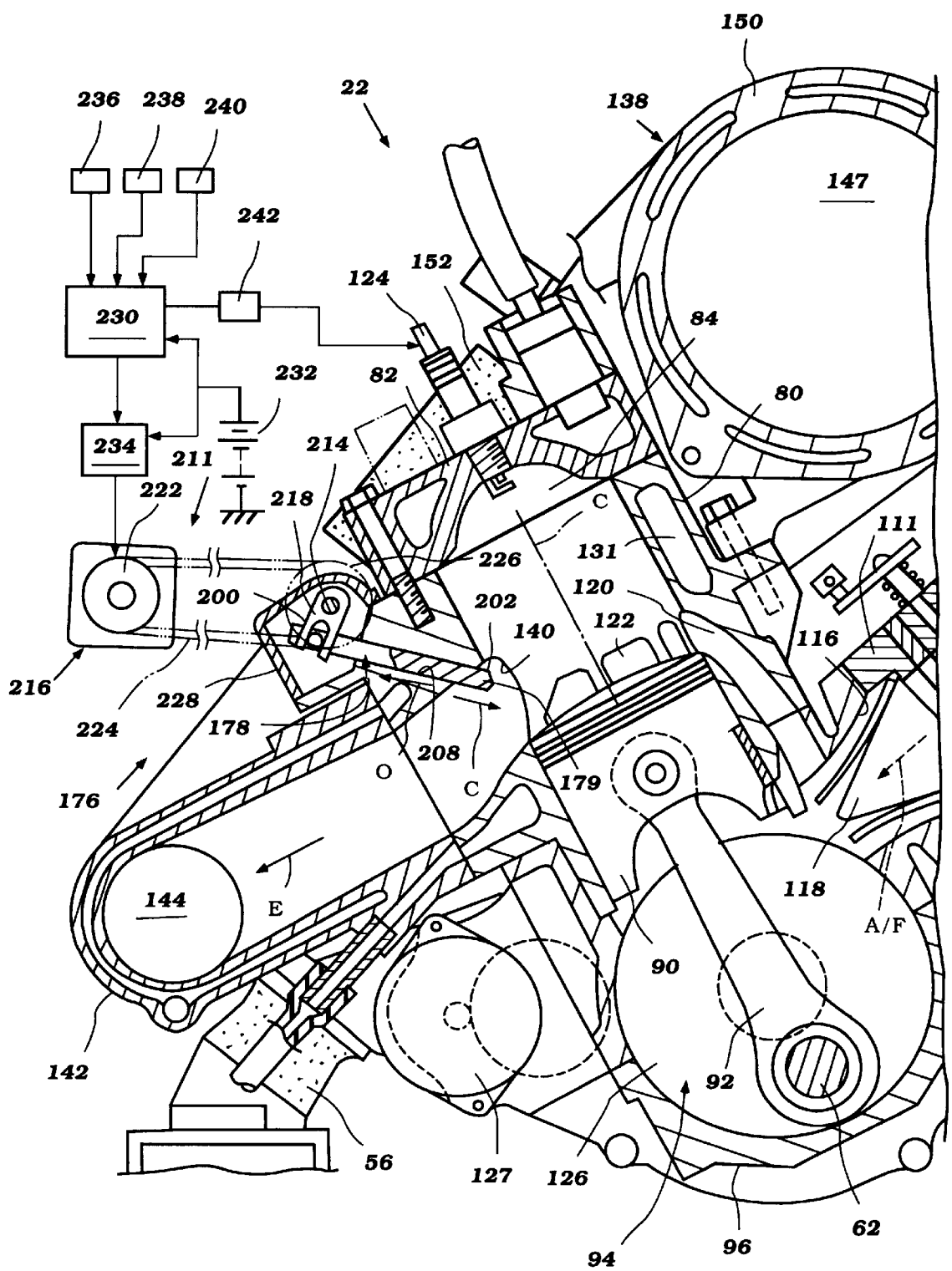
FIG. 4 is a cross-sectional end view of a portion of the engine illustrated in FIG. 3.
Figure 5:
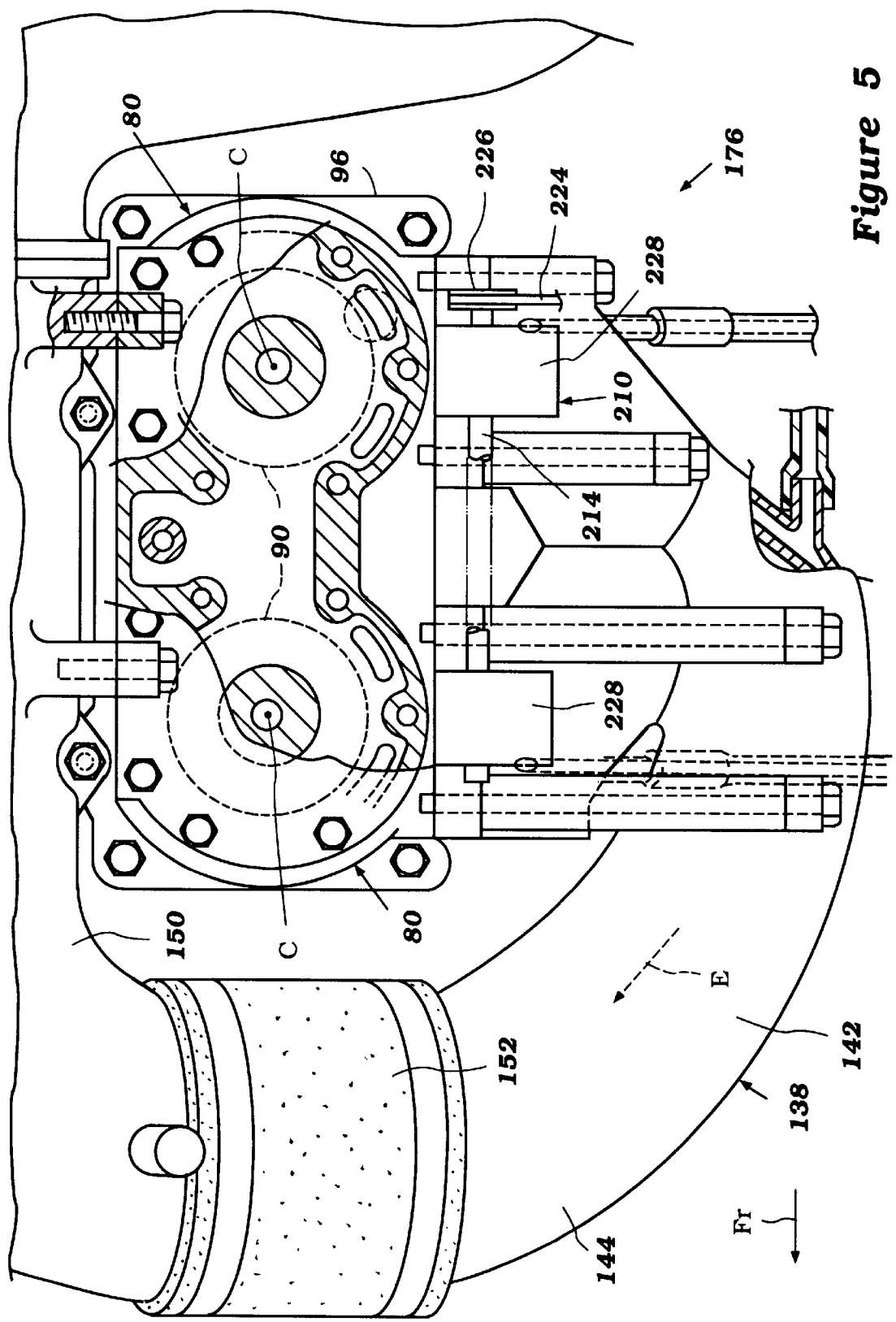
FIG. 5 is a cross-sectional top view of the engine illustrated in FIG. 3.

The engine 22 is best illustrated in FIG. 4. As illustrated therein, the engine 22 is preferably of the two-cylinder, two-cycle variety. Of course, the engine 22 may have as few as one, or more than two, cylinders and operate in accordance with other operating cycles, as may be appreciated by one skilled in the art.

The engine 22 includes a cylinder block 80 having a cylinder head 82 connected thereto and cooperating therewith to define two combustion chambers 84 defined by a cylinder wall within the block 80 and a recessed area in the cylinder head 82. A piston 90 is movably mounted in each combustion chamber, and connected to the crankshaft 62 via a connecting rod 92, as is well known in the art. Preferably, the engine 22 is tilted so that the combustion chambers 84 have a centerline C which is offset in a first direction from a vertical axis. This arrangement keeps the vertical profile of the engine small, allowing the watercraft 20 to be designed with a low center of gravity.

The crankshaft 62 is rotatably journalled by a number of sealed bearings with respect to the cylinder block 80 within a crankcase chamber 94. Preferably, the chamber 94 is defined by a crankcase cover member 96 which extends from a bottom portion of the cylinder block 80. The crankshaft 62 has pin portions extending between web portions with each connecting rod 92 connected to one of the pin portions.

As best illustrated in FIG. 3, the engine 22 includes means for providing an air and fuel mixture to each combustion chamber 84. Preferably, an intake system 103 is provided for delivering air for combustion to the engine. The intake system 103 draws air A from within the engine compartment 54 (the air entering the engine compartment through one or more air inlets in the hull 26) a silencer 104 and delivered to a venturi passage 106 in a carburetor 108.

Fuel is provided to the incoming air. In particular, fuel is drawn from a fuel tank 110 (see FIG. 1) positioned in the engine compartment 54, by a fuel pump (not shown), and delivered through a fuel delivery line to the carburetor. A throttle body or intake pipe 111 is preferably positioned between the engine 22 and the carburetor 108 and has a throttle valve for allowing the watercraft operator to control the rate of fuel and air delivery (A/F) to the engine 22 for controlling the speed and power output of the engine via a throttle linkage. It is contemplated that the fuel may be provided by indirect or direct fuel injection, as well as via carburation, as known in the art.

The air and fuel mixture (A/F) selectively passes through an intake port 116 into the crankcase chamber 94 as controlled by a reed valve 118, as is known in the art. As is also well known, an intake port 116 and corresponding reed valve 118 are preferably provided corresponding to each combustion chamber 84. The crankcase chamber 94 is compartmentalized so as to provide the crankcase compression feature for each combustion chamber as is well known in the operation of two-cycle engines.

The fuel and air charge within the crankcase chamber 94 is delivered to each combustion chamber 84 through a scavenge passage 120 leading to a number of scavenge ports 122 in the cylinder wall.

A suitable ignition system is provided for igniting the air and fuel mixture provided to each combustion chamber. Preferably, this system comprises a spark plug 124 (see FIGS. 3 and 4) corresponding to each combustion chamber. The spark plugs are preferably fired by a suitable ignition system.

As illustrated in FIG. 3, a flywheel 126 is connected to one end of the crankshaft 62. The flywheel 126 may have a number of magnets thereon for use in a pulser-coil arrangement for generating firing signals for the ignition system. In addition, the ignition system may include a battery for use in providing power to an electric starter 127 and other electrical engine features. In that case, a number of teeth are positioned on the periphery of the flywheel 126 for use in starting the engine 22 with the starter motor 127. In particular, as illustrated in FIG. 4, the starter motor is positioned near the bottom 58 of the hull 26.

The engine 22 includes a lubricating system for providing lubricating oil to the various moving parts thereof. Preferably, the lubricating system includes an oil tank or reservoir (not shown) from which lubricating oil is delivered and circulated throughout the engine, as is well known to those skilled in the art.

The engine 22 also preferably includes a suitable cooling system. Preferably, the cooling system is a liquid cooling system which draws cooling water from the body of water in which the watercraft 20 is being operated and circulates it through various cooling waterjackets 131 in the cylinder block 80, head 82, and the like.

As stated above, the crankshaft 62 drives the impeller 72 of the propulsion unit 24. Referring to FIG. 1, the end of the crankshaft 62 extends through the crankcase cover to a coupling 135 where it is coupled to an end of the impeller shaft 64.

Exhaust gas generated by the engine 22 is routed from the engine to a point external to the watercraft 20 by an exhaust system 138 which includes an exhaust passage or port 140 leading from each combustion chamber 84 through the cylinder head 82. An exhaust manifold 142 is connected to a side of the engine 22. The manifold 142 has a pair of branches with passages leading therethrough aligned with the passages 142 leading through the cylinder head 82 and merging into a single passage 144. Exhaust generated by each combustion chamber is routed through the passage 140 to the manifold 142.

After the branches of the manifold 142 merge, the manifold curves around the front end of the engine 22. An expansion pipe 150 is connected to the exhaust manifold 142, preferably via a flexible sleeve 152. The expansion pipe 150 has an enlarged passage or chamber 147 through which exhaust routed from the passage 144 in the exhaust manifold flows. A catalyst (not shown) may be positioned within the expansion pipe 150.

After flowing through the expansion pipe 150, the exhaust flows into an upper exhaust pipe section 162 of the exhaust system. This portion of the exhaust system is tapers to a smaller diameter from that of the expansion pipe 150. This exhaust pipe 162 leads to a water lock 164. The exhaust pipe 162 is preferably connected to the water lock 164 via a flexible fitting, such as a rubber sleeve. The exhaust flows through the water lock 164, which is preferably arranged as known to those skilled in the art, and then passes to a lower exhaust pipe 166 which has its terminus in a passage in which the water propulsion unit 24 is provided. In this manner, exhaust flows from the engine 22 through the exhaust system to its discharge within water positioned in the passage, and is thus discharged from the craft 20.

As a portion of the cooling system, and as best illustrated in FIG. 4, a cooling jacket is preferably provided for cooling the exhaust system, including the exhaust manifold 144 and the expansion pipe 150.

Means are provided for controlling the flow of exhaust gases through each exhaust passage 140 from the combustion chamber 84. Preferably, this means comprises an exhaust control device 176. The exhaust control device 176 comprises a sliding knife-type valve 178 and means for moving the valve.

As illustrated in FIG. 4, the valve 178 has a generally flat or plate-like body 179, having a generally circular cut-out edge 202 at one end and a pin 200 positioned at the other. The edge 202 is shaped such that when the body of the valve 178 is retracted, the edge 202 cooperates with the cylinder block 80 to define a smooth exhaust passage 140.

As illustrated in FIG. 4, the valve 178 is mounted in a guide or passage 208 in the block 80. In particular, a guide or passage 208 extends through the block 80 from a top side adjacent the cylinder head 82 into the exhaust passage 140.

So arranged, the body 179 of the valve 178 is movable between a first or closed position "C" and a second or open position "O". In the first position, the body of the valve 178 is moved downwardly in the direction "C" until the valve 178 extends into the exhaust passage 140, partially blocking it. This has the effect of delaying the time the exhaust starts to pass from the combustion chamber 84 to the exhaust passage 140 (as the piston 90 moves downwardly from top dead center) and has the effect of causing the exhaust to stop flowing earlier (as the piston 90 moves upwardly) as compared to the second position of the valve 178. In the second position, the valve 178 does not obscure, or at least obscures less as compared to its first position, the passage 140. In this position, the exhaust flow starts earlier and lasts longer.

As stated above, means for moving the valve 178 between its positions are provided. Preferably, this means comprises an actuating device in the form of an electric motor 210. In the preferred embodiment of the invention, the motor 210 is mounted remotely from the valve body 179, and as such, the means for moving includes a transmission mechanism 211 for transmitting movement of the actuator to the valve 178.

The transmission mechanism 211 includes a shaft 214 mounted for rotation with respect to the cylinder block 80. An arm 218 extends from the shaft 214 generally perpendicular thereto. The arm 218 has a slot for accepting the pin 200 extending from the valve 178. Each arm 218 is preferably positioned under a cover 228, as best illustrated in FIG. 4.

In addition, the transmission mechanism 211 includes a looping cable 224 extending around a motor pulley 222 mounted on an output shaft of the motor and a follower pulley 226 mounted on the end of the shaft 214 corresponding to the valve closest the rear end of the engine 22.

The transmission mechanism 211 is arranged so that if the motor 210 moves the pulley 222 in a first direction, the cable 224 moves in the same direction, rotating the follower pulley 226. Rotation of the follower pulley 226 causes the shaft 214 to rotate, and the arm 218 to move the pin 200 corresponding to each valve 178, and thus each valve 178. Of course, if the motor 210 causes the drive pulley 222 to move in the opposite direction, the valve plates 196 are moved in the opposite direction as well. In this manner, the valves 178 are moved between their first and second positions.

A motor control is provided for controlling the motor 210 in an appropriate manner so as to control the movement of the valves 178 in relation to the engine speed, load and other characteristics of the engine, as described below.

An electrical system is provided for the watercraft 20. Preferably, the electrical system includes a power source 232, such as a battery or generator, for powering a main or master control unit 230 and, selectively, a drive control 234. The main control unit 230 is preferably arranged with no main switch between it and the power source 232, such that power is always provided to the control unit 230. The drive control 234 is arranged to turn on and off the motor 210 which drives the drive pulley 222, as controlled or instructed by the main control unit 230.

A lanyard switch 242 is provided for controlling the power flow to the ignition circuit of the watercraft 20. The lanyard switch 242 is preferably of the type which includes a mechanism by which the switch 242 is shut off in an emergency situation, such as when the user falls from the watercraft 20. For example, the switch 242 may be connected to a wrist leash worn by the user. In the event the user falls from the craft or the like, the switch 242 is triggered and cuts power to the ignition, thereby stopping the engine 22.

A starter switch 236 is provided for turning on and off the power to one or more engine systems, including the starter motor 127. This switch 236 may be conveniently positioned near the steering handle 40.

A selector switch 238, described in more detail below, is also preferably provided and is preferably positioned near the starter switch 236.

Information regarding the speed of the watercraft is preferably provided to the control unit 230 by a speed sensor 240. The speed sensor 240 may be of a number of varieties known to those skilled in the art.

In accordance with the present invention, an exhaust control valve operating strategy, including a cleaning mode or arrangement, is provided. Preferably, the exhaust valve cleaning arrangement comprises selective movement of the valve 178.

Figure 6:
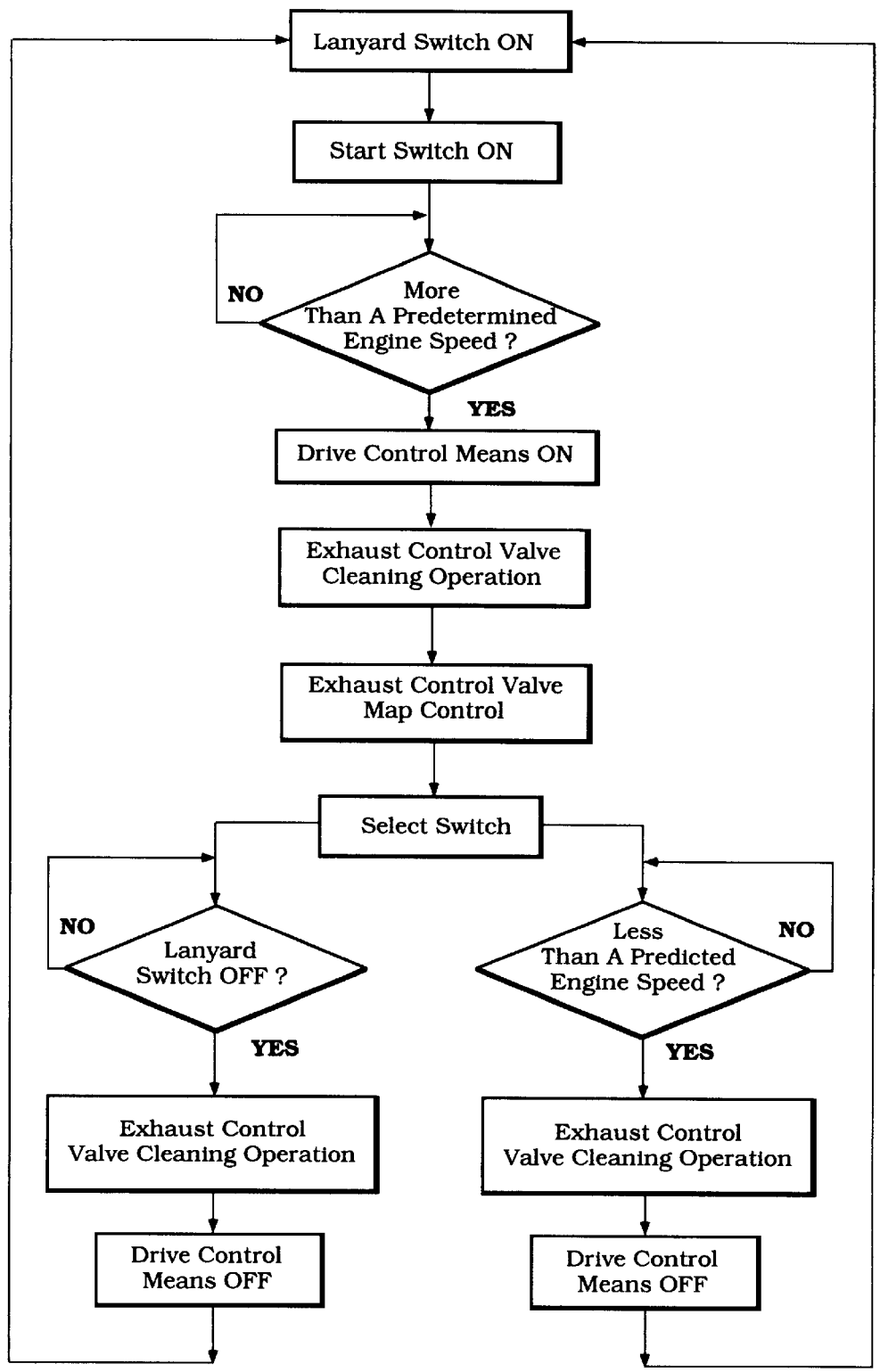
FIG. 6 is a flow diagram of the exhaust valve control of the present invention.

Referring to FIG. 6, an exhaust valve control strategy is employed by the control unit 230 for moving the exhaust control valves 178, the control strategy including an exhaust valve cleaning mode. In a first step, the lanyard switch 242 must be "ON" (i.e., allowing power to flow to the control unit 230 and the ignition system). If the lanyard switch 242 is "ON" the control unit 230 then determines if the starter switch 236 is also "ON," that is, if it is determined that the engine is started, checks the engine speed as sensed by the speed sensor 240. If the engine speed 240 is less than a predetermined speed, the control unit 230 continues to monitor the engine speed until it reaches the predetermined speed. Once the engine speed exceeds the predetermined engine speed, the control unit 230 turns the drive control 234 "ON." This predetermined speed is preferably a speed less than the idle speed of the engine. For example, if the idle speed of the engine is 1250 rpm, then in this step the engine speed being checked should be below this speed. Preferably, the checked engine speed is at an engine start speed such as 500 rpm.

After the drive control 234 is turned "ON" an exhaust valve cleaning operation is commenced, preferably at an engine speed less than a speed of the engine which corresponds to a watercraft planing speed. If the engine speed quickly exceeds that speed corresponding to the watercraft planing speed, the cleaning operation may be aborted. Otherwise, the drive control 234 turns on the motor 210, moving the exhaust control valves 178. Preferably, the valves 178 are caused to move some degree between the open and closed position to scrape off harmful carbon and other deposits. In this regard it is noted that the valves 178 need not be moved completely from their open to closed positions, but simply partially over that range to remove the deposits. Preferably, the movement of the valves 178 is not to such a degree as might serious hinder engine operation, such as causing stalling of the engine.

After completion of the cleaning operation, the control unit 230 controls the exhaust valves 178 through the drive control 234 in accordance with a mapped (i.e., such as from a memory unit) exhaust valve control strategy. This strategy may control the valves 178 based on engine speed and the like. For example, the valves 178 are generally moved towards or to their "closed" position when the engine speed is low, so as to retard the exhaust timing and increase compression, while the valves are moved toward or to their open position as engine speed becomes high to advance the exhaust timing.

Next, the position of the selector switch 238 is determined. Preferably, the switch 238 is movable into first and second positions by a user, although the switch may simply comprise an internal control of the control unit 230 which is variably selected. If in a first position, the control unit 230 determines if the lanyard switch 242 is "OFF." If not, the control unit 230 waits until it is. Once the lanyard switch 242 is detected as "OFF" the drive control 234 starts an exhaust valve cleaning operation in a similar manner to that described above, and then the drive control 234 is shut "OFF." At this time, the electrical system is shut off and the engine is not running, and the operation does not begin again until the lanyard switch 242 is turned back "ON."

If the selector switch 238 is in the second position, the control unit 230 first checks to determine if the engine speed is less than a predetermined engine speed. If not, the control unit 230 continues checking the engine speed. Once the engine speed falls below the predetermined engine speed, the control unit 230 initiates an exhaust valve cleaning operation through the drive control 234, as described above. This low speed may correspond to a speed less than idle, indicating that the engine is being shut off. The drive control 234 is then shut "OFF" and the control unit 230 rechecks to determine if the engine speed is above a predetermined speed.

Thus, it may be understood that the control unit 230 turns off the drive control 234 when the engine is stopped, which may be either when either an ignition control switch 238 or lanyard switch 236 is activated to shut off the engine, or when the engine stops, as evident by the engine speed.

As an alternate arrangement of the present invention, it is possible to eliminate the selector switch 238. In that case, the control 230 may be arranged to initiate the exhaust valve cleaning operation when either the lanyard switch 236 is turned off or the engine speed is less than a predetermined value. Then, the control 230 is arranged to again turn off the drive control 234.

In accordance with the present invention, the exhaust cleaning operation is preferably performed while the engine is running, such as at an engine speed between the idle speed and that corresponding to a watercraft planing speed, after the engine has been started. In addition, the cleaning operation is performed at engine shut-down. The cleaning operation is beneficial in keeping the exhaust valves 178 free of harmful deposits. In this regard it is noted that the valve cleaning operation may be performed at any speed of the engine less than a predetermined speed, with such preferably performed at an engine speed less than a speed of the engine corresponding to a watercraft planing speed.

As one variation of the present invention, it is also possible to perform the valve cleaning operation only when the engine speed reaches or is below a predetermined engine speed while the engine speed is increasing, but with the cleaning operation not performed at the same speed when the engine speed is decreasing. Alternatively, it is possible to perform the valve cleaning operation only when the engine speed falls to a predetermined engine speed while the engine speed is increasing, but with the cleaning not performed at the same speed when the engine speed is increasing.

Of course, the foregoing description is that of preferred embodiments of the invention, and various changes and modifications may be made without departing from the spirit and scope of the invention, as defined by the appended claims.

What is claimed is:

1. A watercraft having an engine powering a water propulsion unit, said engine having an exhaust port leading from a combustion chamber for routing exhaust products therefrom and an exhaust valve cooperable with said exhaust port and movable between a first position for delaying the closing of said exhaust portion and a second position for advancing the closing of said exhaust port, said watercraft having a control unit powered in an unswitched manner by a power source and a drive control for moving said exhaust valve at least partially between said first and second positions in an exhaust cleaning operation, said control unit activating said drive control when said engine is started and deactivating said drive control when said engine is stopped.

2. The watercraft in accordance with claim 1, wherein said watercraft includes an engine start button and said control unit activates said drive control when said start button is moved to a position for starting said engine.

3. The watercraft in accordance with claim 1, wherein said watercraft includes a stop switch and said control unit deactivates said drive control when said stop switch is moved to a position for stopping said engine.

4. The watercraft in accordance with claim 3, wherein said stop switch comprises a lanyard switch.

5. The watercraft in accordance with claim 1, wherein said drive control initiates an exhaust valve cleaning mode after being turned on.

6. The watercraft in accordance with claim 5, wherein said drive control initiates said exhaust valve cleaning mode when said engine speed is below an engine speed corresponding to a planing speed of said watercraft.

7. An exhaust control for an exhaust valve of an internal combustion engine, the engine having at least one combustion chamber, an intake passage leading to said at least one combustion chamber for providing air thereto, a fuel supply for supplying fuel to said combustion chamber, and an exhaust port leading from said combustion chamber for routing exhaust products therefrom, said valve cooperable with said exhaust port and movable between a first position for delaying the closing of said exhaust port and a second position for advancing the closing of said exhaust port, said exhaust control including means for moving said valve between said first and second position and control means for moving said valve in a cleaning operation at least partially between said first and second positions when said engine is running but when a speed of said engine is below a predetermined speed.

8. The exhaust control in accordance with claim 7, wherein said engine is utilized to power a watercraft and said predetermined speed is below a speed of said engine corresponding to a planing speed of said watercraft.

9. The exhaust control in accordance with claim 7, wherein said control means moves said valve in a cleaning operation when said engine speed is also above a predetermined low speed.

10. The exhaust control in accordance with claim 9, wherein said predetermined low speed comprises an idle speed of said engine.

11. The exhaust control in accordance with claim 7, wherein said control means includes a normal valve operation mode in which said valve is moved based upon engine speed.

12. The exhaust control in accordance with claim 7, wherein said valve comprises a sliding knife-type valve.

13. The exhaust control in accordance with claim 7, wherein said control means moves said valve in an exhaust cleaning mode when said engine is shut off.

14. The exhaust control in accordance with claim 7, wherein after said cleaning operation said control means controls said valve in accordance with a mapped exhaust control strategy based at least partly on engine speed.

15. The exhaust control in accordance with claim 14, wherein when an engine speed falls below a predetermined low speed after control of said valve in accordance with said mapped strategy, said control means moves said valve in another cleaning operation.

16. An engine having at least one combustion chamber with an exhaust port leading therefrom, an exhaust port timing control valve provided in the port at an upper portion thereof, said valve being movable between a projected position wherein it is projected into the exhaust port and covers at least the upper portion of the exhaust port, and a retracted position in which it is retracted from the exhaust port, means for moving said valve between said projected and retracted positions, a drive control for moving said valve and a main control for controlling said drive control between on and off states, the main control turning on said drive control when the engine is started and turning off said drive control when the engine is stopped, and wherein said main control operates said drive control in a cleaning mode and a regular valve operation mode, and wherein said control unit initiates a valve cleaning mode in which said valve is moved between its projected and retracted positions by said drive control when a speed of said engine after starting exceeds a predetermined low speed but is below a predetermined high speed.

17. The engine in accordance with claim 16, wherein said engine includes a power supply and a main switch for controlling power flowing from said supply to said main control, and wherein when said switch is moved to an off position after said engine has been running, said main control initiates said valve cleaning mode.

18. The engine in accordance with claim 16, wherein said main control initiates a valve cleaning mode when a speed of said engine falls below a predetermined low speed.

19. The engine in accordance with claim 16, further including a motor for driving said valve and wherein said drive control controls said motor.

20. A method of cleaning an exhaust control valve of an engine having at least one combustion chamber, an exhaust passage leading from the chamber and the exhaust control valve cooperating with the passage, comprising the steps of determining if said engine is running, and if so, determining if a speed of said engine is below a predetermined speed, and if so, moving said valve in a cleaning operation between at least partially between a first position in which said valve does not obstruct said passage and a second position in which said valve at least partially obstructs said passage in order to clean the valve.

21. The method in accordance with claim 20, further including the step of determining if the speed of said engine is above a predetermined low speed after said step of determining if said engine is running, and only if said engine speed is above said predetermined low speed then moving said valve in said cleaning operation.

22. The method in accordance with claim 21, further including the step of determining if said engine is being shut off, and if so, moving said valve in said cleaning operation.

23. The method in accordance with claim 20, further including the step of determining if said engine is operating at a speed above said predetermined speed, and if so, controlling said valve in accordance with a mapped control strategy based at least partly on engine speed.

* * * * *